United States Patent
Badding et al.

(10) Patent No.: US 12,034,152 B2
(45) Date of Patent: Jul. 9, 2024

(54) CATHODES FOR SOLID-STATE LITHIUM SULFUR BATTERIES AND METHODS OF MANUFACTURING THEREOF

(71) Applicants: Corning Incorporated, Corning, NY (US); SHANGHAI INSTITUTE OF CERAMICS, CHINESE ACADEMY OF SCIENCES, Shanghai (CN)

(72) Inventors: Michael Edward Badding, Campbell, NY (US); Jun Jin, Shanghai (CN); Yang Lu, Shanghai (CN); Zhen Song, Painted Post, NY (US); Zhaoyin Wen, Shanghai (CN); Tongping Xiu, Shanghai (CN)

(73) Assignees: CORNING INCORPORATED, Corning, NY (US); Shanghai Institute of Ceramics, Chinese Academy of Sciences, Shanghai (CN)

( * ) Notice: Subject to any disclaimer, the term of this patent is extended or adjusted under 35 U.S.C. 154(b) by 720 days.

(21) Appl. No.: 17/255,274

(22) PCT Filed: Jun. 20, 2019

(86) PCT No.: PCT/US2019/038195
§ 371 (c)(1),
(2) Date: Dec. 22, 2020

(87) PCT Pub. No.: WO2020/005702
PCT Pub. Date: Jan. 2, 2020

(65) Prior Publication Data
US 2021/0111400 A1    Apr. 15, 2021

Related U.S. Application Data

(60) Provisional application No. 62/689,546, filed on Jun. 25, 2018.

(30) Foreign Application Priority Data

Nov. 8, 2018 (CN) .......................... 201811325286.5

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0404* (2013.01); *H01M 4/13* (2013.01);
(Continued)

(58) Field of Classification Search
CPC ...... H01M 4/04; H01M 4/0404; H01M 4/366; H01M 4/139; H01M 4/13; H01M 4/382; H01M 4/624
See application file for complete search history.

(56) References Cited

U.S. PATENT DOCUMENTS

| 5,189,770 A | 3/1993 | Waidhas et al. |
| 6,224,639 B1 | 5/2001 | Hamada et al. |

(Continued)

FOREIGN PATENT DOCUMENTS

| CN | 104157461 A | 11/2014 |
| CN | 105047882 A | 11/2015 |

(Continued)

OTHER PUBLICATIONS

Hong-Jie Peng et al: "A review of flexible lithium-sulfur and analogous alkali metal-chalcogen rechargeable batteries", Chemical Society Reviews, vol. 46, No. 17, Jan. 1, 2017, pp. 5237-5288, XP055616437.
(Continued)

*Primary Examiner* — Kenneth J Douyette (57) ABSTRACT

A cathode for a lithium-sulfur battery includes a sulfur-based composite layer having a porosity in a range of 60%
(Continued)

to 99%; and a conductive polymer disposed atop the composite layer and within pores of the composite layer. Moreover, a method of forming a cathode for a lithium-sulfur battery includes providing a substrate; disposing a sulfur-based slurry layer on the substrate; freeze-drying the slurry layer to form a sulfur-based composite layer having a porosity in a range of 60% to 99%; and disposing a conductive polymer atop the composite layer and within pores of the composite layer.

19 Claims, 7 Drawing Sheets

(51) Int. Cl.

| | | |
|---|---|---|
| H01M 4/13 | (2010.01) | |
| H01M 4/139 | (2010.01) | |
| H01M 4/38 | (2006.01) | |
| H01M 4/62 | (2006.01) | |
| H01M 10/052 | (2010.01) | |
| H01M 4/02 | (2006.01) | |

(52) U.S. Cl.
CPC ........... *H01M 4/139* (2013.01); *H01M 4/382* (2013.01); *H01M 4/624* (2013.01); *H01M 10/052* (2013.01); *H01M 2004/021* (2013.01)

(56) References Cited

U.S. PATENT DOCUMENTS

| | | | |
|---|---|---|---|
| 2003/0113624 A1* | 6/2003 | Kim | H01M 4/364 |
| | | | 429/231.95 |
| 2005/0175903 A1* | 8/2005 | Kim | H01M 4/622 |
| | | | 429/339 |
| 2006/0292350 A1 | 12/2006 | Kawamura et al. | |
| 2014/0334067 A1 | 11/2014 | Aoki et al. | |
| 2015/0349307 A1 | 12/2015 | Dadheech et al. | |
| 2016/0351973 A1* | 12/2016 | Albano | H01M 4/628 |
| 2017/0062869 A1 | 3/2017 | Zhamu et al. | |
| 2017/0117547 A1* | 4/2017 | Fanous | H01M 4/364 |
| 2017/0207484 A1 | 7/2017 | Zhamu et al. | |
| 2017/0207488 A1 | 7/2017 | Zhamu et al. | |

FOREIGN PATENT DOCUMENTS

| | | |
|---|---|---|
| CN | 106410116 A | 2/2017 |
| CN | 106848232 A | 6/2017 |
| CN | 108140850 A | 6/2018 |
| JP | 11-339816 A | 12/1999 |
| JP | 2011-077006 A | 4/2011 |
| KR | 2017-0112202 A | 10/2017 |
| WO | 2017/171505 A1 | 10/2017 |

OTHER PUBLICATIONS

International Search Report and Written Opinion of the International Searching Authority; PCT/US19/038195; Mailed Sep. 30, 2019; 12 Pages; European Patent Office.

Sun Minghui et al: "Hierarchically porous materials: Synthesis strategies and emerging applications", Frontiers of Chemical Science and Engineering, Higher Education Press, Heidelberg, vol. 10, No. 3, Aug. 21, 2016, pp. 301-347, XP036039158.

Zhang X et al: "Advances in lithium-sulfur batteries", Materials Science and Engineering: R: Reports, vol. 121, Jan. 1, 2017, pp. 1-29, XP085238437.

Zhen Li et al: "Status and prospects in sulfur-carbon composites as cathode materials for rechargeable lithium-sulfur batteries", Carbon., vol. 92, Oct. 1, 2015, pp. 41-63, XP055390215.

Bruce et al., "Li—O2 and Li—S Batteries with High Energy Storage", Nature Materials, vol. 11, 2012, pp. 19-29.

Manthiram et al., "Rechargeable Lithium-Sulfur Batteries", Chemical Reviews, 2014, vol. 114, No. 23, pp. 11751-11787.

Wang et al., "Improved Performance of Li—S Battery with Hybrid Electrolyte by Interface Modification", Solid State Ionics, 2017, pp. 67-72.

Yang et al., "Phase Inversion: A Universal Method to Create High-Performance Porous Electrodes for Nanoparticle-Based Energy Storage Devices", Adv. Funct. Mater., 2016, vol. 26, No. 46, pp. 8427-8434.

Yao et al, "High-Performance All-Solid-State Lithium-Sulfur Batteries Enabled by Amorphous Sulfur-Coated Reduced Graphene Oxide Cathodes", Adv. Energy Mater. 2017, 1602923, pp. 1-9.

Zhang et al., "Recent Advances in Electrolytes for Lithium-Sulfur Batteries", Adv. Energy Mater. 2015, vol. 5, No. 16, 1500117, pp. 1-28.

Zhang et al., "Sulfur Double Locked By A Macro-structural Cathode And A Solid Polymer Electrolyte For Lithium-sulfur Batteries", Journal of Materials Chemistry A, 2015, vol. 3, No. 20, pp. 10760-10766.

Zhu et al., "A Bifunctional Ion-electron Conducting Interlayer For High Energy Density All-solid-state Lithium-sulfur Battery", Journal of Power Sources, vol. 351, May 31, 2017, pp. 17-25.

Chinese Patent Application No. 201811325286.5, Office Action, dated Oct. 24, 2023, 16 pages (11 pages of English Translation and 5 pages of Original Copy); Chinese Patent Office.

* cited by examiner

CATHODES FOR SOLID-STATE LITHIUM SULFUR BATTERIES AND METHODS OF MANUFACTURING THEREOF

CROSS-REFERENCE TO RELATED APPLICATIONS

This application is a National Stage application under 35 U.S.C. § 371 of International Application No. PCT/US2019/038195, filed on Jun. 20, 2019, which claims the benefit of priority under 35 U.S.C. § 119 of U.S. Provisional Application No. 62/689,546, filed Jun. 25, 2018, and Chinese Application No. 201811325286.5, filed Nov. 8, 2018, the contents of all of which are incorporated herein by reference in their entireties.

BACKGROUND

Field

This disclosure relates to cathodes for solid-state lithium sulfur (Li—S) batteries and methods of manufacturing thereof.

Technical Background

Lithium-sulfur (Li—S) batteries are promising candidates for replacing conventional lithium-ion batteries since they are cheaper, weigh less, and can store nearly double the energy for the same mass. For example, Li—S cell chemistries have a high energy density (e.g., 2600 W·h·kg$^{-1}$) and theoretical specific capacity (e.g., 1675 mA·h·g$^{-1}$), natural abundance and is environmentally friendly.

One challenge for conventional Li—S technologies is the electronically and ionically insulating nature of elemental sulfur (used as a component in the cathode), which requires a large fraction of conducting additives in the cathode and as a result, significantly reduces practical capacity and applicability. Another drawback is the soluble nature of the long-chain polysulfides produced during battery discharging in conventional organic electrolytes. As a result of polysulfide migration from the cathode to the lithium (Li) anode, unwanted side reactions are induced, with the polysulfide shuttling resulting in a lowered Coulombic efficiency and a continuous loss of the active cathode material.

The present application discloses improved cathodes and methods of formation thereof for solid-state lithium sulfur (Li—S) battery applications.

SUMMARY

In some embodiments, a cathode for a lithium-sulfur battery, comprises: a sulfur-based composite layer having a porosity in a range of 60% to 99%; and a conductive polymer disposed atop the composite layer and within pores of the composite layer.

In one aspect, which is combinable with any of the other aspects or embodiments, the composite layer has a porosity in a range of 60% to 80%.

In one aspect, which is combinable with any of the other aspects or embodiments, the pores of the composite layer have a size in a range of 1 μm to 50 μm.

In one aspect, which is combinable with any of the other aspects or embodiments, the pore size is in a range of 2 μm to 10 μm.

In one aspect, which is combinable with any of the other aspects or embodiments, the composite layer comprises a carbon material present as at least one of nanoparticles, nanowires, nanofibers, nanorods, nanotubes, nanospheres, graphene, or combinations thereof.

In one aspect, which is combinable with any of the other aspects or embodiments, the carbon material is present in a range of 5 wt. % to 40 wt. %.

In one aspect, which is combinable with any of the other aspects or embodiments, the composite layer comprises a metal carbide in a range of 1 wt. % to 20 wt. %.

In one aspect, which is combinable with any of the other aspects or embodiments, the conductive polymer comprises at least one of carbon polysulfides (CS), polyethylene oxides (PEO), polyaniline (PANI), polypyrrole (PPY), poly(3,4-ethylenedioxythiophene) (PEDOT), polystyrenesulfonic acid (PSS), polyacrylonitrile (PAN), polyacrylic acid (PAA), polyallylamine hydrochloride (PAH), poly(vinylidene fluoride-co-hexafluoropropylene) (P(VdF-co-HFP)), poly(methylmethacrylate) (PMMA), polyvinylidene fluoride (PVDF), poly(diallyldimethyl ammonium) bis(trifluoromethanesulfonyl)imide (TFSI) (PDDATFSI), or combinations thereof and at least one of bis(trifluoromethane) sulfonimide lithium salt (LiTFSI), lithium perchlorate, lithium bis(oxalato) borate (LiBOB), lithium bis(fluorosulfonyl)imide (LiFSI), or combinations thereof.

In some embodiments, a lithium-sulfur (Li—S) battery, comprises: a lithium anode; a solid-state electrolyte; and a cathode as disclosed herein.

In one aspect, which is combinable with any of the other aspects or embodiments, the Li—S battery is configured to have a discharge capacity retention rate of at least 90%.

In one aspect, which is combinable with any of the other aspects or embodiments, the solid-state electrolyte comprises at least one of: Li$_{6.4}$La$_3$Zr$_{1.4}$Ta$_{0.6}$O$_{12}$ (LLZTO), Li$_{10}$GeP$_2$S$_{12}$, Li$_{1.5}$Al$_{0.5}$Ge$_{1.5}$(PO$_4$)$_3$, Li$_{1.4}$Al$_{0.4}$Ti$_{1.6}$(PO$_4$)$_3$, Li$_{0.55}$La$_{0.35}$TiO$_3$, interpenetrating polymer networks of poly (ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed Li$_3$PS$_4$, or combinations thereof.

In some embodiments, a method of forming a cathode for a lithium-sulfur battery, comprises: providing a substrate; disposing a sulfur-based slurry layer on the substrate; freeze-drying the slurry layer to form a sulfur-based composite layer having a porosity in a range of 60% to 99%; and disposing a conductive polymer atop the composite layer and within pores of the composite layer.

In one aspect, which is combinable with any of the other aspects or embodiments, the substrate is a current collector.

In one aspect, which is combinable with any of the other aspects or embodiments, the method further comprises: mixing a metal carbide, carbon material, and sulfur material in a solvent to form a sulfur precursor; and dry milling the dry sulfur precursor to form a sulfur composite.

In one aspect, which is combinable with any of the other aspects or embodiments, the method further comprises: agitating the sulfur composite with a binder to form the sulfur-based slurry.

In one aspect, which is combinable with any of the other aspects or embodiments, the carbon material is at least one of: nanoparticles, nanowires, nanofibers, nanorods, nanotubes, nanospheres, graphene, or combinations thereof, and the binder comprises at least one of styrene-butadiene rubber, carboxyl methyl cellulose, polyacrylic acid (PAA), sodium alginate, or combinations thereof.

In one aspect, which is combinable with any of the other aspects or embodiments, the composite layer has a porosity in a range of 60% to 80%.

In one aspect, which is combinable with any of the other aspects or embodiments, the pores of the composite layer have a size in a range of 1 µm to 50 µm.

In one aspect, which is combinable with any of the other aspects or embodiments, the pore size is in a range of 2 µm to 10 µm.

In one aspect, which is combinable with any of the other aspects or embodiments, the step of freeze-drying comprises: freezing the slurry layer at a temperature in a range of −50° C. and 0° C. for a time in a range of 1 hr to 12 hrs; and drying the frozen slurry layer in a freeze drier for a time in a range of 1 hr to 24 hrs.

In one aspect, which is combinable with any of the other aspects or embodiments, the step of disposing the conductive polymer is conducted by at least one of spin coating, dip coating, layer-by-layer deposition, sol-gel deposition, inkjet printing, or combinations thereof.

In some embodiments, a method of forming a lithium-sulfur (Li—S) battery, comprising: providing a substrate; providing a cathode formed by: disposing a sulfur-based slurry layer on the substrate; freeze-drying the slurry layer to form a sulfur-based composite layer having a porosity in a range of 60% to 99%; and disposing a conductive polymer atop the composite layer and within pores of the composite layer; providing a solid-state electrolyte; and providing a lithium anode.

In one aspect, which is combinable with any of the other aspects or embodiments, the solid-state electrolyte comprises at least one of: $Li_{6.4}La_3Zr_{1.4}Ta_{0.6}O_{12}$ (LLZTO), $Li_{10}GeP_2S_{12}$, $Li_{1.5}Al_{0.5}Ge_{1.5}(PO_4)_3$, $Li_{1.4}Al_{0.4}Ti_{1.6}(PO_4)_3$, $Li_{0.55}La_{0.35}TiO_3$, interpenetrating polymer networks of poly(ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed $Li_3PS_4$, or combinations thereof.

BRIEF DESCRIPTION OF THE DRAWINGS

The disclosure will become more fully understood from the following detailed description, taken in conjunction with the accompanying figures, in which.

DETAILED DESCRIPTION

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. It should be understood that the present application is not limited to the details or methodology set forth in the description or illustrated in the figures. It should also be understood that the terminology is for the purpose of description only and should not be regarded as limiting.

Additionally, any examples set forth in this specification are illustrative, but not limiting, and merely set forth some of the many possible embodiments of the claimed invention. Other suitable modifications and adaptations of the variety of conditions and parameters normally encountered in the field, and which would be apparent to those skilled in the art, are within the spirit and scope of the disclosure.

The present disclosure relates to solid-state lithium sulfur batteries, and more particularly, to sulfur cathodes and their method of production, in which a lithium ion conductive polymer layer (e.g., polyethylene oxide (PEO)) coated porous sulfur cathode is used for solid-state lithium sulfur batteries.

Figure 1:
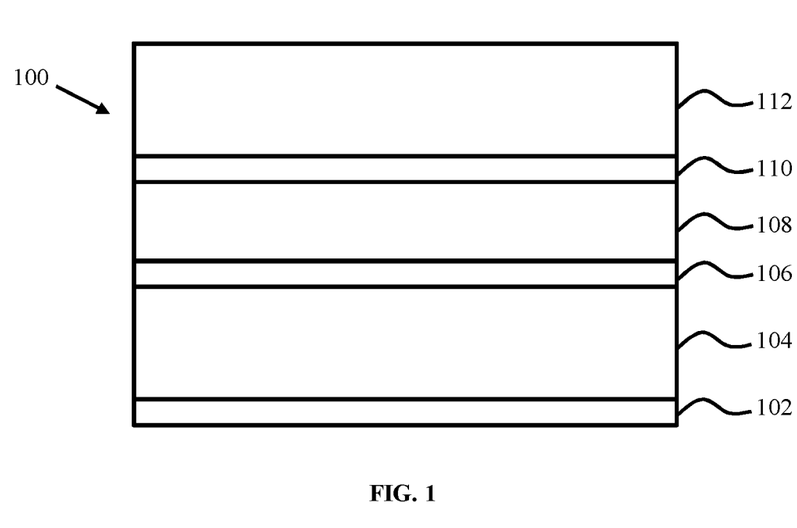
FIG. 1 illustrates a structure of a solid-state lithium sulfur (Li—S) battery, according to some embodiments.

FIG. 1 illustrates an example of a solid-state lithium sulfur (Li—S) battery structure, according to some embodiments. It will be understood by those of skill in the art that the processes described herein can be applied to other configurations of solid-state lithium sulfur (Li—S) battery structures.

In some embodiments, battery 100 may include a substrate 102 (e.g., a current collector), a sulfur electrode (e.g., cathode) 104 disposed on the substrate, a first interlayer 106 disposed on the cathode, a solid-state electrolyte 108 disposed on the first interlayer, a second interlayer 110 disposed on the electrolyte, and a lithium electrode (e.g., anode) 112 disposed on the second interlayer. These can be disposed horizontally in relation to each other or vertically.

In some examples, the substrate 102 may a current collector including at least one of three-dimensional nickel (Ni) foam, carbon fiber, foils (e.g., aluminum, stainless steel, copper, platinum, nickel, etc.), or a combination thereof. In some examples, the interlayer 106 and 110 may be independently chosen from at least one of carbon-based interlayers (e.g., interlinked freestanding, micro/mesopore containing, functionalized, biomass derived), polymer-based interlayers (e.g., PEO, polypyrrole (PPY), polyvinylidene fluoride, etc.), metal-based (e.g., Ni foam, etc.), or a combination thereof.

In some examples, solid-state electrolyte 108 may be used to address common safety concerns such as leakage, poor chemical stability, and flammability often seen in Li—S batteries employing liquid electrolytes. Moreover, solid-state electrolytes can also suppress polysulfide shuttling from the cathode to the anode, thereby leading to improved cathode utilization and a high discharge capacity and energy density. In some examples, the solid-state electrolyte may include at least one of $Li_{6.4}La_3Zr_{1.4}Ta_{0.6}O_{12}$ (LLZTO), $Li_{10}GeP_2S_{12}$, $Li_{1.5}Al_{0.5}Ge_{1.5}(PO_4)_3$, $Li_{1.4}Al_{0.4}Ti_{1.6}(PO_4)_3$, $Li_{0.55}La_{0.35}TiO_3$, interpenetrating polymer networks of poly(ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed $Li_3PS_4$, or combinations thereof.

In some examples, the anode 112 may comprise lithium (Li) metal. In some examples, the battery may include at least one anode protector such as electrolyte additives (e.g., $LiNO_3$, lanthanum nitrate, copper acetate, $P_2S_5$, etc.), artificial interfacial layers (e.g., $Li_3N$, $(CH_3)_3SiCl$, $Al_2O_3$, LiAl, etc.), composite metallics (e.g., $Li_7B_6$, Li-rGO (reduced graphene oxide), layered Li-rGO, etc.), or combinations thereof.

Description of the sulfur cathode 104 and methods of formation are described below.

Figure 2:
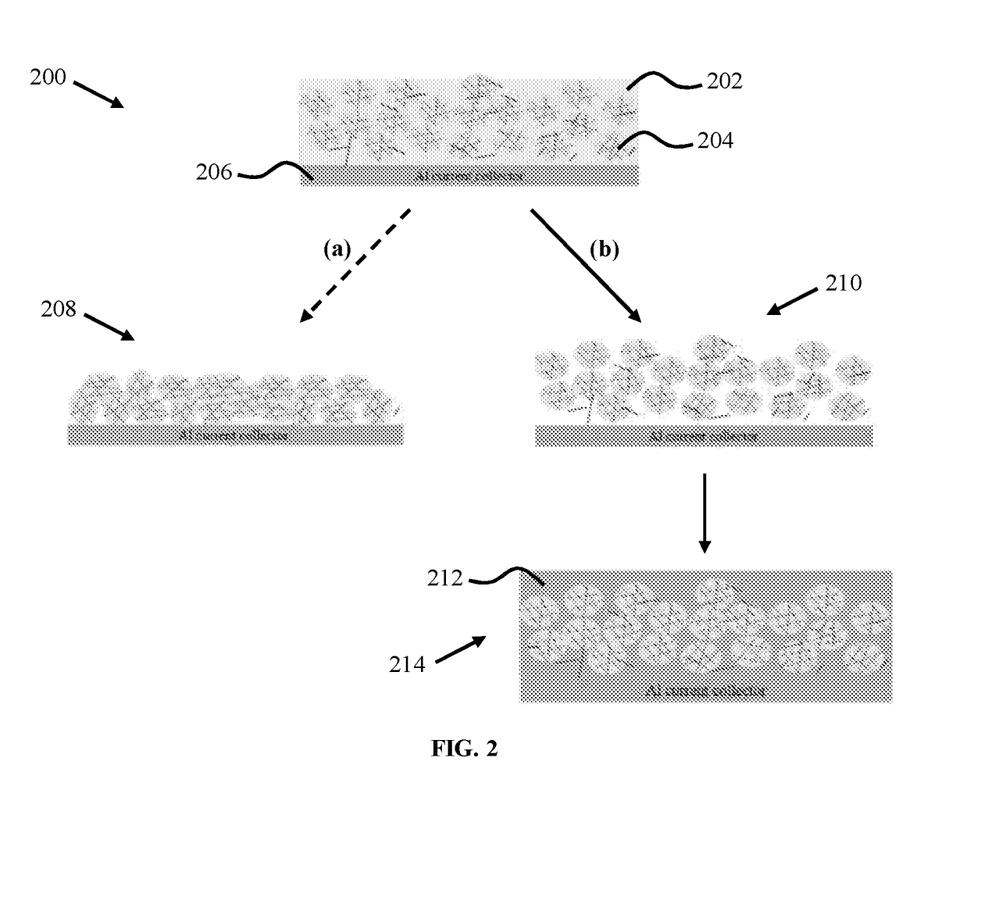
FIG. 2 illustrates a scheme of Li—S sulfur cathode dried by (a) heat drying; and (b) freeze drying.

FIG. 2 illustrates a scheme 200 of Li—S sulfur cathode dried by (a) heat drying; and (b) freeze drying. In a first step of the cathode formation scheme, a current collector substrate 206 is coated with a sulfur-based slurry layer comprising binder 202 and sulfur composite 204. The slurry layer may be formed as follows. Initially, a metal carbide, carbon material, and sulfur material is mixed in a solvent to form a sulfur precursor. The metal carbide may be a carbide comprising at least one of tungsten (W), iron (Fe), chromium (Cr), manganese (Mn), cobalt (Co), nickel (Ni), titanium (Ti), zirconium (Zr), hafnium (Hf), vanadium (V), niobium (Nb), tantalum (Ta), molybdenum (Mo), sodium (Na), calcium (Ca), or a combination thereof. The carbon material may be at least one of nanoparticles, nanowires, nanofibers, nanorods, nanotubes, nanospheres, graphene, or combinations thereof. The sulfur material is elemental sulfur. The solvent may be any known compatible solvent such as at least one of water, hexane, octane, acetone, tetrahydrofuran, 2-butanone, toluene, xylene, ethanol, methanol, isopropanol, benzene, or combinations thereof. In some examples the mixing may be conducted by at least one of ball milling, sonication, magnetic mixing, vortex mixing, etc.

Thereafter, the sulfur precursor may be milled (e.g., dry milling, etc.) to form a sulfur composite, which is then mixed and agitated with a binder to form the sulfur-based slurry. In some examples, the binder includes at least one of styrene-butadiene rubber, carboxyl methyl cellulose, polyacrylic acid (PAA), sodium alginate, or combinations thereof. In some examples, the binder includes styrene-butadiene rubber and carboxyl methyl cellulose. In some examples, the binder includes water. The slurry having the sulfur composite 204 and binder 202 is then positioned onto the substrate 206 by at least one of spin coating, dip coating, layer-by-layer deposition, sol-gel deposition, inkjet printing, or combinations thereof.

Conventionally, the slurry layer is heat dried, as in route (a) of FIG. 2. This generally leads to a dense packing structure 208 as the solvent is removed in the heat drying process. As demonstrated and explained in the examples below, the dense packing structure 208 results in a lower available internal volume space (i.e., lower porosity, fewer irregular pores) within the composite layer for incorporation of a subsequently formed conductive polymer.

According to the present disclosure as in route (b) of FIG. 2, after the sulfur-based slurry layer has been disposed on the substrate, the slurry layer is freeze-dried to form a sulfur-based composite layer 210 having a porosity in a range of 60% to 99%. The structure of sulfur cathode may be held by freezing the solvent in the slurry layer at low temperatures before drying. Pores are formed in the composite layer as the frozen solvent sublimes during the drying (i.e., pores remain in the at the position where the solvent was originally located). In other words, during the process of freeze-drying, internal volume space of the composite layer occupied by the solvent may be retained, thereby avoiding shrinkage of the composite layer caused by the volatilization of the solvent during the drying process. Compared with traditional heat drying, freeze-drying may increase composite layer porosity by 3-5×.

In some examples, the composite layer has a porosity in a range of 60% to 80% (as compared with porosity of the heat-dried slurry layer, which has a porosity in a range of 30% to 50%). In some examples, pores of the composite layer may have a size in a range of 1 μm to 50 μm. In some examples, the pores may have a range of 2 μm to 10 μm. In some examples, the freezing is conducted at a temperature in a range of −50° C. and 0° C., or in a range of −35° C. and −10° C., or in a range of −25° C. and −15° C. In some examples, the freezing is conducted at a temperature of −20° C. In some examples, the freezing is conducted for a time in a range of 1 hr to 12 hrs, or in a range of 2 hrs to 9 hrs, or in a range of 4 hrs to 7 hrs. In some examples, the freezing is conducted for a time of 6 hrs. In some examples, the freezing is conducted at a temperature of −20° C. for a time of 6 hrs. In some examples, the drying is conducted in a freeze drier for a time in a range of 1 hr to 24 hrs, or in a range of 6 hrs to 18 hrs, or in a range of 9 hrs to 15 hrs. In some examples, the drying is conducted for a time of 12 hrs.

In some examples, the composite layer includes carbon material in a range of 5 wt. % to 40 wt. %, or in a range of 10 wt. % to 30 wt. %, or in a range of 15 wt. % to 25 wt. %. In some examples, the composite layer includes metal carbide in a range of 1 wt. % to 20 wt. %, or in a range of 3 wt. % to 17 wt. %, or in a range of 5 wt. % to 15 wt. %. The carbon material and metal carbide are conductive portions uniformly dispersed in the final sulfur cathode that aide in adsorbing polysulfide (i.e., minimizing polysulfide migration) to improve sulfur utilization (i.e., minimizing loss of active cathode material).

After the step of freeze-drying, a conductive polymer 212 is disposed atop the composite layer 210 and within pores of the composite layer 210 by at least one of spin coating, dip coating, layer-by-layer deposition, sol-gel deposition, inkjet printing, or combinations thereof to achieve the final cathode structure 214. In some examples, the conductive polymer comprises at least one of carbon polysulfides (CS), polyethylene oxides (PEO), polyaniline (PANI), polypyrrole (PPY), poly(3,4-ethylenedioxythiophene) (PEDOT), polystyrenesulfonic acid (PSS), polyacrylonitrile (PAN), polyacrylic acid (PAA), polyallylamine hydrochloride (PAH), poly(vinylidene fluoride-co-hexafluoropropylene) (P(VdF-co-HFP)), poly(methylmethacrylate) (PMMA), polyvinylidene fluoride (PVDF), poly(diallyldimethyl ammonium) bis(trifluoromethanesulfonyl)imide (TFSI) (PDDATFSI), or combinations thereof and at least one of bis(trifluoromethane) sulfonimide lithium salt (LiTFSI), lithium perchlorate, lithium bis(oxalato) borate (LiBOB), lithium bis(fluorosulfonyl)imide (LiFSI), or combinations thereof.

In some examples, the conductive polymer is a polyethylene oxide. Because freeze-drying creates pores and pathways within the interior of the composite layer, the conductive polymer slurry (e.g., PEO electrolyte) is able to penetrate into the composite layer through its porous structure after it has been coated onto the surface of the composite layer. This surface coating and internal penetration improves interfacial compatibility and enhances ionic conductivity of the resultant sulfur electrode.

EXAMPLES

Example 1

Sulfur, tungsten carbide (WC) and vapor-growth carbon fiber (VGCF) are ball-milled at a weight ratio of 6:2:2 in ethanol. After ball-milling for 4 hours, the mixed powder is filtered and dried. After an additional dry grinding (e.g., dry milling) for 24 hrs, the mixture is sieved to form a sulfur composite. A slurry is prepared by ball-milling or stirring a mixture comprising the previously-prepared sulfur composite, tungsten carbide (WC), vapor-growth carbon fiber (VGCF), styrene-butadiene rubber (SBR), and carboxyl methyl cellulose (CMC) at a weight ratio of 80:5:5:5:5. Thereafter, the slurry was coated on an aluminum foil having a thickness of 100 μm.

The slurry-coated aluminum foil was then frozen at −20° C. for about 6 hrs, and then positioned in a freeze drier for approximately 12 hrs to purge the water content in the slurry. After freeze-drying, the electrode was diced into 12 mm diameter disks. The sulfur content of the cathode was measured at about 1.78 mg/cm$^2$.

Polyethylene oxide (PEO) powder and bis(trifluoromethane) sulfonimide lithium salt (LiN(CF$_3$SO$_2$)$_2$, or LiTFSI) are dissolved into acetonitrile at a mole ratio of PEO to Li$^+$ of about 18:1. The solid content of the slurry is about 10%. This slurry is cast on the surface of the freeze-dried cathode and thereafter, the cathode is dried under vacuum at about 60° C. where the solvent was volatilized to form the sulfur cathode. To ensure an adequate ion and electron conductive network in the cathode, the cathode is designed to have a thickness of less than 200 μm. The final sulfur cathode is then assembled with other parts (e.g., interlayer, electrolyte, Li anode) into a battery.

Comparative Example 1

The sample formed as comparative example 1 is prepared as provided above in example 1 except for the step of freeze-drying. Instead, after coating the slurry onto the aluminum foil, the structure was heat-dried in a furnace at a temperature of approximately 60° C. to purge the water content in the slurry. Subsequently, the electrode was diced into 12 mm diameter disks.

Characterization of Example 1 and Comparative Example 1

Figure 3:
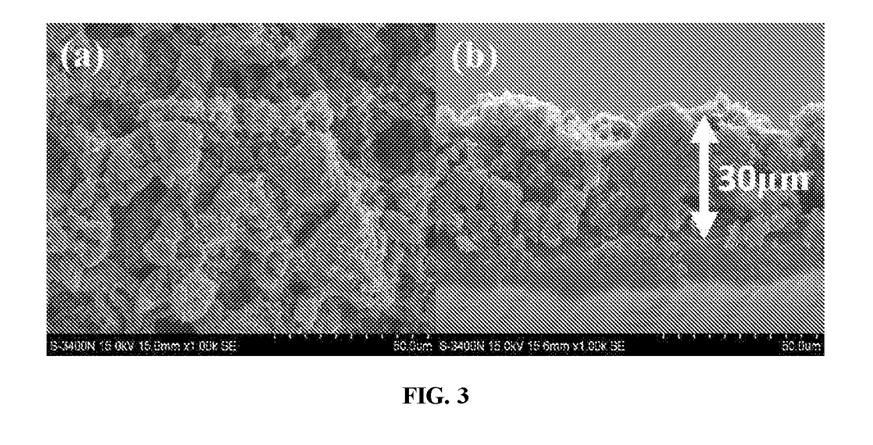
FIG. 3 illustrates (a) surface and (b) cross-sectional scanning electron microscopy (SEM) images of a cathode electrode, as in comparative example 1.

FIG. 3 illustrates (a) surface (plane-view) and (b) cross-sectional SEM images of a cathode electrode, as in comparative example 1. Morphology analysis described herein was conducted by scanning electron microscopy (SEM, Hitachi JSM 6700) and element mapping images were characterized by an energy dispersive spectrometer (EDS) affiliated with the HITACHI SEM. As is seen in FIGS. 3(a) and (b), furnace heat-drying resulted in sizeable particle agglomeration, with the agglomerated particles separating from the conductive network. For example, the initial coating thickness of the slurry on the aluminum foil was set at 100 μm. After the heat treatment at 60° C., the initial slurry film experienced significant decrease in thickness of about 70%, as the after heat drying thickness was measured to be about 30 μm. More importantly, due to this shrinkage of the sulfur-based composite layer as the incorporated water is evaporated, the composite layer retains a lower porosity and the finally-formed cathode has a non-uniform thickness. In other words, the heat treatment corresponds to a lower available internal volume space within the composite layer for incorporation of the conductive polymer.

Figure 4:
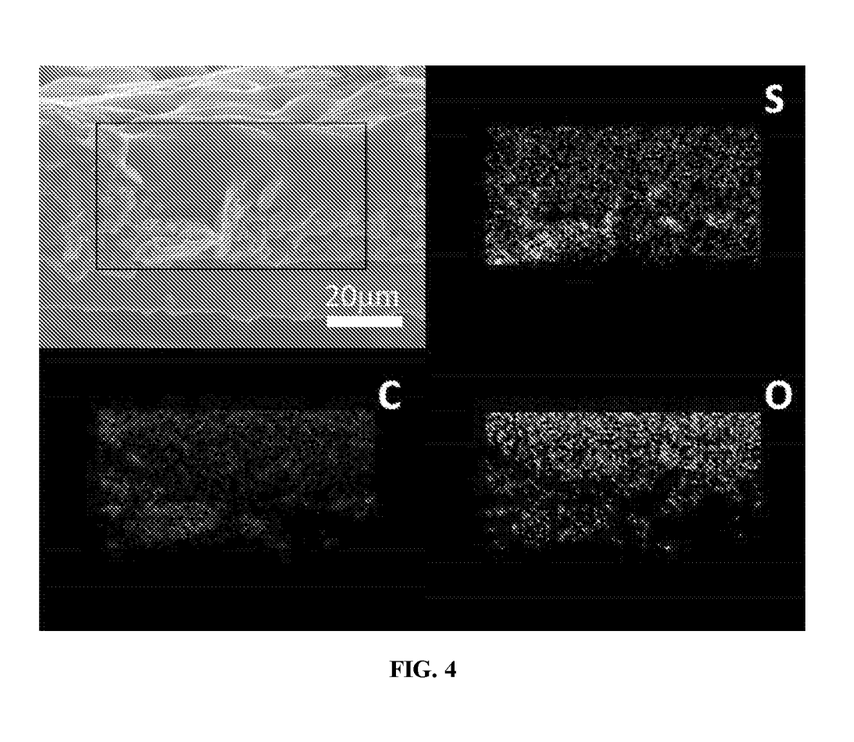
FIG. 4 illustrates cross-sectional SEM images and corresponding energy dispersive spectroscopy (EDS) mapping of cathode samples (coated with PEO), as in comparative example 1.

FIG. 4 illustrates cross-sectional SEM images and corresponding energy dispersive spectroscopy (EDS) mapping of cathode samples coated with PEO conductive polymer (i.e., PEO electrolyte), as in comparative example 1. As shown by the cross-sectional SEM image (top-left), upon application, though the surface of the sulfur electrode is completely covered by PEO electrolyte, there is a distribution gradient of oxygen in the electrode (as seen in the EDS mapping image, bottom-right). In other words, oxygen is concentrated towards a top surface of the electrode, without being able to sufficiently penetrate the electrode body. This is observed in the EDS image as bright luminescence where most of the oxygen is positioned (i.e., on the top surface of the electrode where the PEO electrolyte was deposited), followed by a sharp decline of luminescence with increasing depth into the electrode from the top surface. Inadequate penetration of the PEO polymer layer suggests that fewer irregular pores are formed in the electrode by heat drying process. As seen in the top-right and bottom-left images, sulfur and carbon, content, respectively, is unevenly distributed throughout the electrode as scattered pockets of high luminescence are observed; this confirms the agglomeration of particles during the heat drying process.

Figure 5:
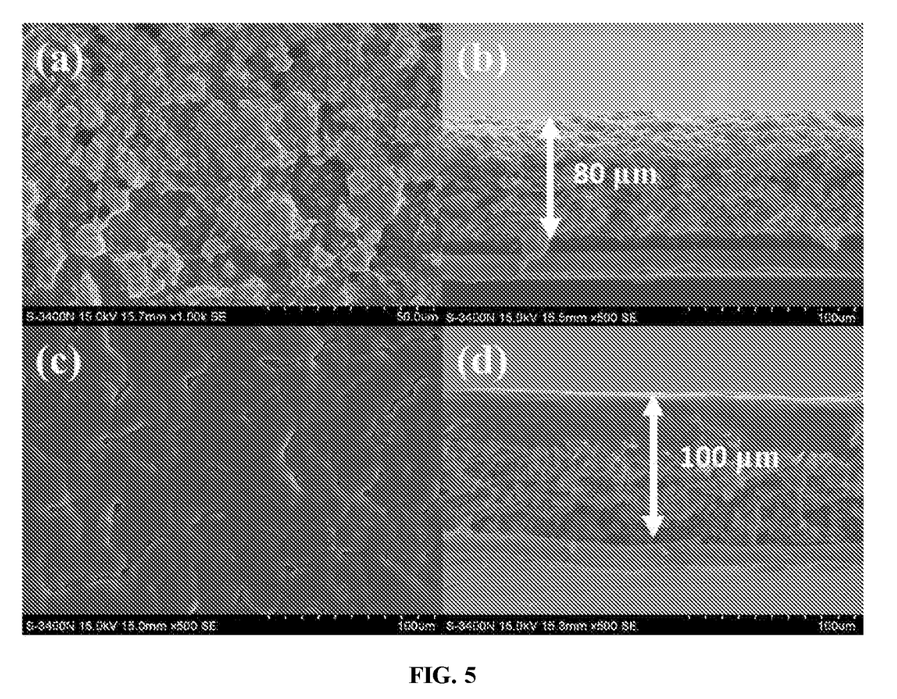
FIG. 5 illustrates (a) surface and (b) cross-sectional SEM images of a cathode electrode; and (c) surface and (d) cross-sectional SEM images of cathode samples coated with a PEO-based electrolyte layer, as in example 1.

FIG. 5 illustrates (a) surface and (b) cross-sectional SEM images of a cathode electrode; and (c) surface and (d) cross-sectional SEM images of cathode samples coated with a PEO-based electrolyte layer, as in example 1. Compared to results of the heat drying process as in FIGS. 3(a) and (b), agglomeration of particles is alleviated (FIGS. 5(a) and (b)) as the resulting cathode is relatively uniform with a smooth, homogenous surface and a high-conductive network (i.e., particles are connected with carbon nanofiber). Cross-section comparisons between FIGS. 3(b) and 5(b) indicate a much less rough top surface for samples prepared by freeze drying as well as a greater thickness overall (30 μm for heat drying versus 80 μm for freeze drying), thereby suggesting a morphology with a lower degree of stacking and greater amount of open space (i.e., pore volume) in the body of the cathode. These results are consistent with structures 208 (heat drying) and 210 (freeze drying) of FIG. 2. Because the underlying cathode has a more consistent surface morphology and greater internal pore volume, when covered with the PEO electrolyte, a smooth PEO layer (of about 20 μm) is formed atop the cathode as well as homogenous PEO penetration into the body of the electrode (FIGS. 5(c) and (d)).

Figure 6:
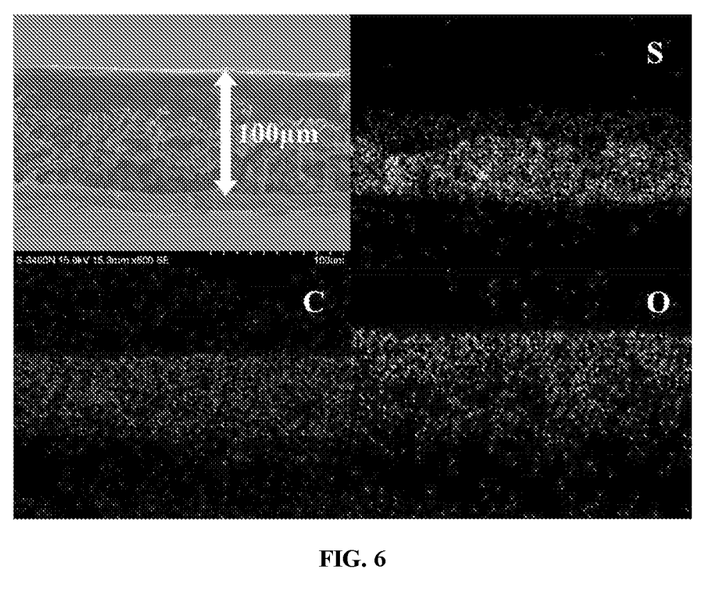
FIG. 6 illustrates cross-sectional SEM images and corresponding EDS mapping of cathode samples (coated with PEO), as in example 1.

FIG. 6 illustrates cross-sectional SEM images and corresponding EDS mapping of cathode samples coated with PEO electrolyte, as in example 1. As indicated by the cross-sectional image (top-left), the surface of the sulfur electrode is completely covered by PEO electrolyte. Unlike the images for the heat drying process of FIG. 4, a uniform distribution of sulfur (top-right) and carbon (bottom-left) in the electrode demonstrates that the electrode prepared by freeze-drying does not exhibit particle agglomeration. Moreover, while there is a slightly greater amount of oxygen content towards the top surface of the electrode, the oxygen more completely permeates axially through pores of the electrode, as well as providing a relatively uniform lateral distribution of the oxygen (bottom-right). In other words, the oxygen element distribution in the electrode indicates that the PEO slurry may more fully infiltrate into the interior of the electrode (defined by a rich pore structure) prepared by freeze drying than when prepared by heat drying; thereby increasing the ion conductivity of the electrode.

PEO infiltration plays an essential role as an ionic conductive media among the electrolyte (e.g., PEO interlayer, solid-state electrolyte, etc.) and the active materials of the cathode. In the conventional heat-drying process, PEO is added by a simple casting process and subsequent heat-drying. Thus, the PEO slurry is not able to adequately permeate into the pores and other pathways of the sulfur electrode (e.g., structure 20 of FIG. 2) to form an effective ionic conductive path, thereby resulting in a poor utilization of the active materials. Heat-dried prepared cathodes without adequate pore formation PEO infiltration still suffer from dissolution and migration of polysulfide through the PEO electrolyte at high temperatures (i.e., shuttling effect).

Figure 7:
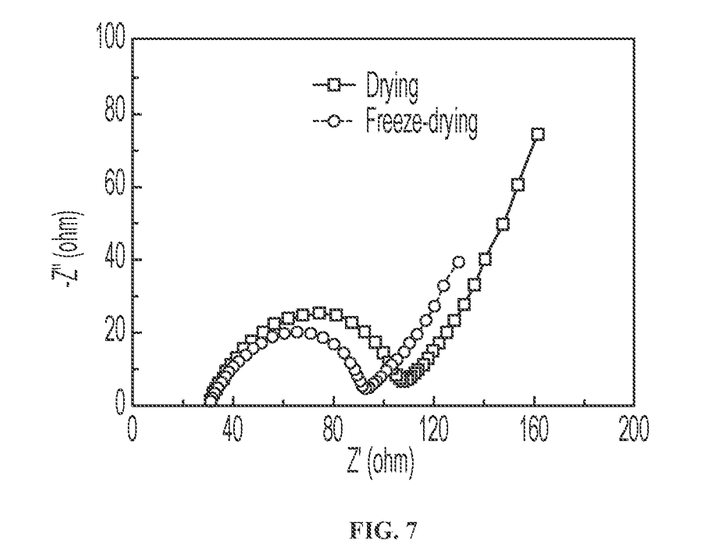
FIG. 7 illustrates impedance plots of a Li—S battery having a cathode prepared by (I) freeze-drying or (II) heat-drying.
Figure 8:
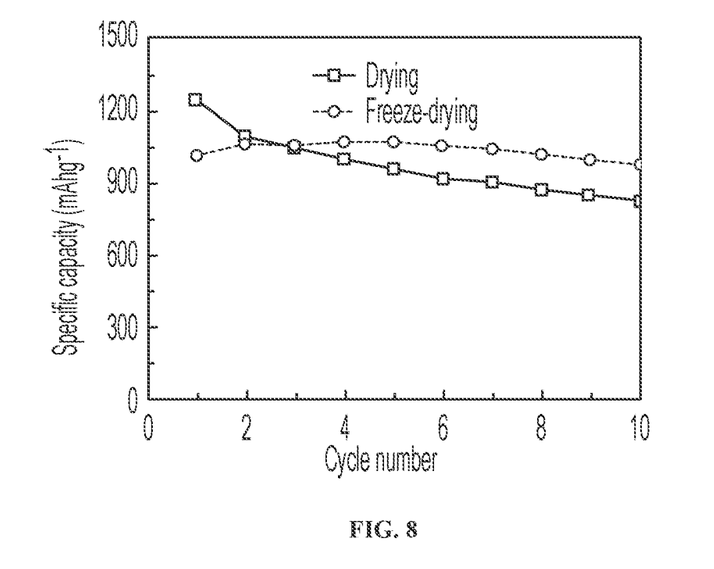
FIG. 8 illustrates cycling performance of a Li—S battery having a cathode prepared by (I) freeze-drying or (II) heat-drying.

FIGS. 7 and 8 illustrate impedance plots and cycling performance, respectively, of a Li—S battery having a cathode prepared by freeze-drying and heat-drying. Electrochemical impedance spectroscopy (EIS) was carried out on an Autolab electrochemical workstation (ECO CHEMIE B.V, Netherlands) with a frequency response analyzer. Because of the pore volume created in the cathode prepared by freeze drying and incorporation of conductive polymer (e.g., PEO), the PEO-based ionic conductor is better able to contact active materials, thereby resulting in a lower overall impedance of the solid-state lithium sulfur battery (60Ω, versus 80Ω for a heat-dried cathode). The lower overall impedance due to PEO contact with the cathode active material effectively reduces charge transfer resistance. The lower porosity of the cathode prepared by heating-drying is harmful to PEO electrolyte infiltration, which results in a high charge transfer resistance.

FIG. 8 illustrates cycling performance of Li—S batteries with a cathode prepared by freeze-drying and heat-drying processes. The cathode prepared by heat-drying shows higher initial discharge capacity and poor cycling performance as compared with cathodes prepared by freeze-drying. The higher initial discharge capacity of heat-dried cathode is due to a short charge transport path, which causes PEO to penetrate into contact with the active material during while resting. The capacity of heat-dried cathode battery degrades with cycling due to the dissolution of the reaction product in the PEO layer. The freeze-dried cathode demonstrates a relatively stable capacity with cycling due to a slow dissolution and diffusion of polysulfides from thick electrodes to PEO layer. Since a large amount of PEO electrolyte penetrates into the freeze-dried prepared cathode, the discharge product dissolved into the PEO which is still in contact with the conductive network of the electrode and therefore, the discharge product may be re-used.

Figure 9:
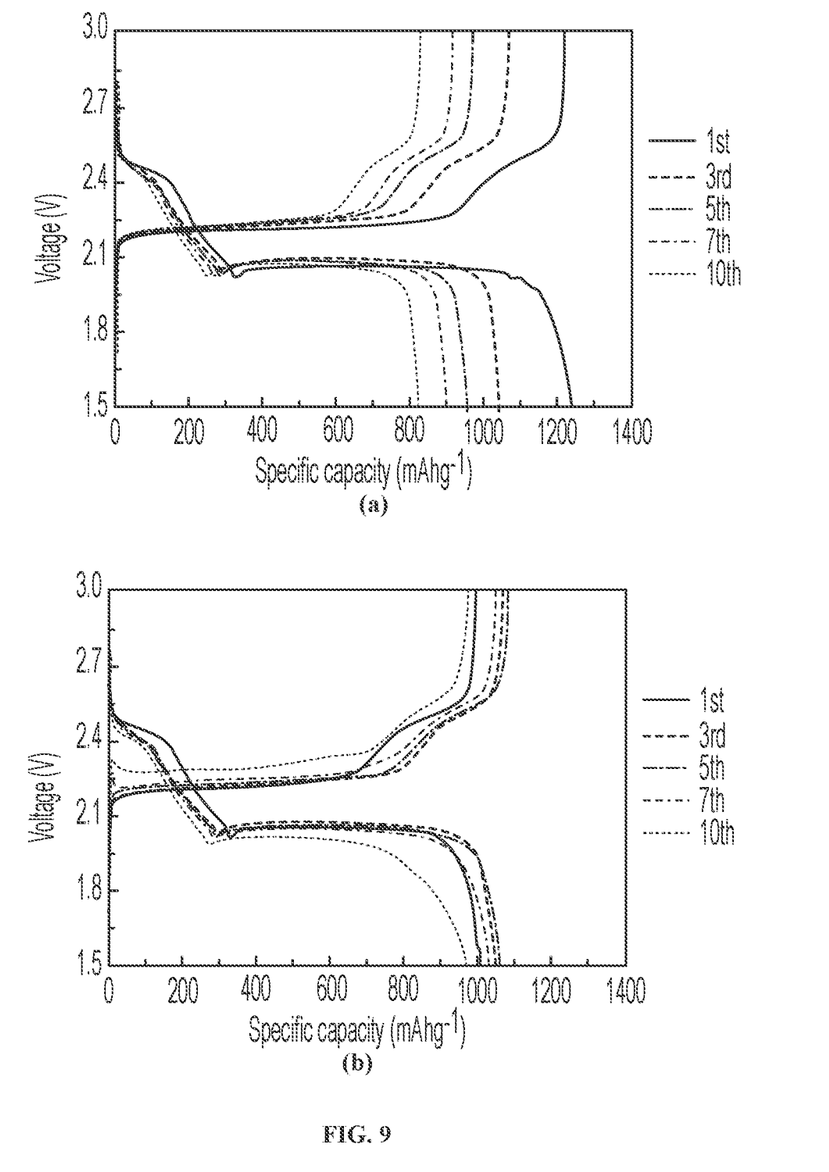
FIG. 9 illustrates charge-discharge curves of Li—S batteries having sulfur cathodes prepared by (a) heat drying; and (b) freeze drying at a current density of 0.1 mA·cm$^{-2}$ at 60° C.

FIG. 9 illustrates charge-discharge curves of Li—S batteries having sulfur cathodes prepared by (a) heat drying; and (b) freeze drying. Electrochemical performance for the solid-state lithium sulfur batteries were measured with a LAND CT2001A battery test system in a voltage range of 3 V to 1.5 V under a current density of 0.1 mA·cm$^{-2}$ at 60° C. Prior to testing, samples were allowed to stand at 70° C. for a time of about 12 hours. The Li—S battery comprising the heat-dried cathode initially demonstrates a discharge capacity over 1200 mAhg$^{-1}$S in a first cycle; however, this specific capacity rapidly diminishes with additional cycles, as it decreases to approximately 800 mAhg$^{-1}$S at the tenth cycle. The Li—S battery comprising the freeze-dried cathode initially demonstrates a discharge capacity over 1000 mAhg$^{-1}$S in a first cycle and is able to maintain this specific capacity even after ten cycles. In other words, the Li—S battery having a freeze-dried cathode delivers reversible capacity at about 1000 mAhg$^{-1}$S for the first ten cycles, and because curves for the different cycles overlap with each other, this suggests a benefit of an enhanced cycling stability of the battery.

Example 2

The slurry was prepared as described in Example 1, and thereafter, coated on an aluminum foil having a thickness of 150 μm.

The slurry-coated aluminum foil was then frozen at −20° C. for about 6 hrs, and then positioned in a freeze drier for approximately 12 hrs to purge the water content in the slurry. After freeze-drying, the electrode was diced into 2 cm×2 cm segments. The sulfur content of the cathode was measured at about 2.9 mg/cm$^2$.

PEO powder and LiTFSI are dissolved into acetonitrile at a mole ratio of PEO to Li$^+$ of about 8:1. The solid content of the slurry is about 5%. This slurry is cast on the surface of the freeze-dried cathode and thereafter, the cathode is dried under vacuum at about 60° C. where the solvent was volatilized to form the sulfur cathode. As in Example 1, the cathode is designed to have a thickness of less than 200 μm.

Interlayer Preparation

PEO powder and LiTFSI are dissolved into acetonitrile at mole ratio of PEO to Li$^+$ of about 18:1. Ionic liquid and 10 wt. % of SiO$_2$ particles (of less than 1000 nm) are added and fully mixed. In some examples, the concentration of silica particles in PEO is in a range of 1 wt. % to 15 wt. %, determined as a function of silica particle size. The SiO$_2$ particles help to reduce the PEO crystallinity and improve Li$^+$ conductivity. The interlayer electrolyte is obtained by pouring the resulting interlayer slurry mixture in to a polytetrafluoroethylene (PTFE) mold for vacuum drying.

The interlayer between the cathode and electrolyte reduces interfacial impedance. In order not to significantly reduce the mass energy density and bulk energy density of the solid-state battery, the interlayer thickness is as thin as possible. In some examples, the thickness of the interlayer may be in a range of 5 μm to 50 μm.

Solid-State Electrolyte Preparation

Cubic phase Li$_{6.4}$La$_3$Zr$_{1.4}$Ta$_{0.6}$O$_{12}$ (LLZTO) is synthesized from starting powders of LiOH·H$_2$O (AR), La$_2$O$_3$ (99.99% purity), ZrO$_2$ (AR), Ta$_2$O$_5$ (99.99% purity) with stoichiometry ratio. A 2 wt. % excess amount of LiOH·H$_2$O is added to compensate for lithium loss during sintering. Traces of moisture and adsorbed CO$_2$ were removed from La$_2$O$_3$ by heat treatment at 900° C. for about 12 hrs. Raw materials were mixed via a wet grinding process where yttrium-stabilized zirconium oxide (YSZ) balls and isopropanol (IPA) were used as the milling media. Following a second mixing step, the mixture was dried and calcined at 950° C. for about 6 hrs in an alumina crucible, and then calcined again at 950° C. for about 6 hrs to obtain pure cubic garnet phase powder. Following the second calcination process, the powders were pressed into ~16 mm diameter green pellets and sintered at 1250° C. for about 10 hrs covered with LLZTO powder having 10 wt. % Li excess in platinum crucibles. Well sintered pellets were polished at a thickness of approximately 0.8 mm.

In some examples (e.g., Example 2), a thin layer of gold (Au) was ion-sputter coated on one side of the LLZTO ceramic for 10 minutes. The sample was then transferred into an argon filled glove box. A portion of the Li foil was melted by heating to at least 250° C. The melted lithium was then cast on a surface of the LLZTO pellet comprising the ion-sputter coated Au layer. The final sulfur cathode (as in Example 2) is then assembled with the interlayer and the LLZTO-Au—Li solid-state electrolyte into a battery.

Battery Assembly

Obtained Li—S batteries obtained by the processes described herein are composed of PEO-coated, freeze-dried sulfur cathodes, with a PEO-based interlayer coated thereon, a LLZTO ceramic solid-state electrolyte, and a lithium metal anode. The solid-state lithium sulfur battery is assembled in glove box filled with inert gas (Ar), with the structure as shown in FIG. 1 (sulfur cathode/interlayer 1/LLZTO/interlayer 2/lithium anode).

Figure 10:
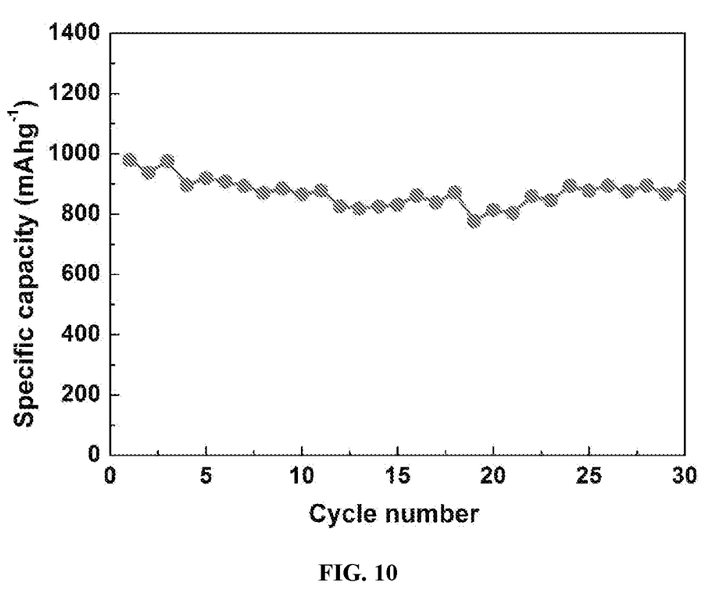
FIG. 10 illustrates cycling performance of Li—S batteries with a cathode prepared by freeze-drying and an Li—Au anode, as in Example 2.

FIG. 10 illustrates cycling performance of a Li—S battery having a cathode prepared by freeze-drying and an Li—Au anode at a current density of 0.1 mA·cm$^{-2}$ at 60° C. (i.e., Example 2). The solid-state Li—S battery shows an initial discharge capacity of 980 mAhg$^{-1}$ and good cycling performance. After 30 cycles, the Li—S battery maintains a discharge capacity of 888 mAhg$^{-1}$, which delivers a 90% capacity retention rate.

Thus, as presented herein, this disclosure relates to solid-state lithium sulfur batteries, and more particularly, to sulfur cathodes and their method of production, in which a lithium ion conductive polymer layer-coated porous sulfur cathode is used for solid-state lithium sulfur batteries. The freeze-drying process disclosed herein generates a more porous and uniform sulfur electrode, as compared with traditional heat-drying prepared cathodes. Moreover, this enhanced porous electrode structure helps in penetration of PEO electrolyte into the cathode, thereby allowing excellent contact between the cathode active material, conductive carbon, and ionic conductive network, as well as increasing the utilization ratio of the sulfur active material. The PEO electrolyte coating may also improve the interface stress and reduce the interface resistance. Therefore, the Li—S battery made from the S-cathode formed from the methods presented here has a higher reversible specific capacity, lower overall impedance, and more stable cycling performance, as compared with Li—S batteries formed with heat-drying prepared cathodes.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, "optional," "optionally," or the like are intended to mean that the subsequently described event or circumstance can or cannot occur, and that the description includes instances where the event or circumstance occurs and instances where it does not occur. The indefinite article "a" or "an" and its corresponding definite article "the" as used herein means at least one, or one or more, unless specified otherwise.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A cathode for a lithium-sulfur battery, comprising:
   a sulfur-based composite layer having a porosity in a range of 60% to 99%; and
   a conductive polymer disposed atop the sulfur-based composite layer and within pores of the sulfur-based composite layer.

2. The cathode of claim 1, wherein the sulfur-based composite layer has a porosity in a range of 60% to 80%.

3. The cathode of claim 1, wherein the pores of the sulfur-based composite layer have a pore size in a range of 1 μm to 50 μm.

4. The cathode of claim 3, wherein the pore size is in a range of 2 μm to 10 μm.

5. The cathode of claim 1, wherein the sulfur-based composite layer comprises a carbon material present as at least one of nanoparticles, nanowires, nanofibers, nanorods, nanotubes, nanospheres, graphene, or combinations thereof.

6. The cathode of claim 5, wherein the carbon material is present in a range of 5 wt % to 40 wt %.

7. The cathode of claim 1, wherein the sulfur-based composite layer comprises a metal carbide in a range of 1 wt % to 20 wt %.

8. The cathode of claim 1, wherein the conductive polymer comprises at least one of carbon polysulfides (CS), polyethylene oxides (PEO), polyaniline (PANI), polypyrrole (PPY), poly(3,4-ethylenedioxythiophene) (PEDOT), polystyrenesulfonic acid (PSS), polyacrylonitrile (PAN), polyacrylic acid (PAA), polyallylamine hydrochloride (PAH), poly(vinylidene fluoride-co-hexafluoropropylene) (P(VdF-co-HFP)), poly(methylmethacrylate) (PMMA), polyvinylidene fluoride (PVDF), poly(diallyldimethyl ammonium) bis(trifluoromethanesulfonyl)imide (TFSI) (PDDATFSI), or combinations thereof.

9. The cathode of claim 1, wherein the conductive polymer comprises polyethylene oxide (PEO).

10. A lithium-sulfur (Li—S) battery, comprising:
    a lithium anode;
    a solid-state electrolyte; and
    a cathode as in claim 1.

11. A method of forming a cathode for a lithium-sulfur battery, comprising:

providing a substrate;

disposing a sulfur-based slurry layer on the substrate;

freeze-drying the sulfur-based slurry layer to form a sulfur-based composite layer having a porosity in a range of 60% to 99%; and disposing a conductive polymer atop the sulfur-based composite layer and within pores of the sulfur-based composite layer.

12. The method of claim 11, wherein the substrate is a current collector.

13. The method of claim 11, further comprising:

mixing a metal carbide, carbon material, and sulfur material in a solvent to form a sulfur precursor;

dry milling the sulfur precursor to form a sulfur composite; and agitating the sulfur composite with a binder to form a sulfur-based slurry that is disposed to form the sulfur-based slurry layer.

14. The method of claim 13, wherein:

the carbon material is at least one of: nanoparticles, nanowires, nanofibers, nanorods, nanotubes, nanospheres, graphene, or combinations thereof, and the binder comprises at least one of styrene-butadiene rubber, carboxyl methyl cellulose, water, or combinations thereof.

15. The method of claim 11, wherein the porosity of the sulfur-based composite layer is in a range of 60% to 80%.

16. The method of claim 11, wherein the pores of the sulfur-based composite layer have a pore size in a range of 1 μm to 50 μm.

17. The method of claim 16, wherein the pore size is in a range of 2 μm to 10 μm.

18. The method of claim 11, wherein the step of freeze-drying comprises:

freezing the sulfur-based slurry layer at a temperature in a range of −50° C. and 0° C. for a time in a range of 1 hour to 12 hours; and drying the frozen sulfur-based slurry layer in a freeze drier for a time in a range of 1 hour to 24 hours.

19. The method of claim 11, wherein the step of disposing the conductive polymer is conducted by at least one of spin coating, dip coating, layer-by-layer deposition, sol-gel deposition, inkjet printing, or combinations thereof.

* * * * *